United States Patent
Orbach

(10) Patent No.: US 8,095,602 B1
(45) Date of Patent: Jan. 10, 2012

(54) SPAM WHITELISTING FOR RECENT SITES

(75) Inventor: Julian J. Orbach, Macquarie Park (AU)

(73) Assignee: Avaya Inc., Basking Ridge, NJ (US)

( * ) Notice: Subject to any disclaimer, the term of this patent is extended or adjusted under 35 U.S.C. 154(b) by 1075 days.

(21) Appl. No.: 11/445,039

(22) Filed: May 30, 2006

(51) Int. Cl.
G06F 15/16 (2006.01)
G06F 15/173 (2006.01)

(52) U.S. Cl. ........................................ 709/206; 709/224

(58) Field of Classification Search .................. 709/206, 709/224; 707/1
See application file for complete search history.

(56) References Cited

U.S. PATENT DOCUMENTS

| | | | |
|---|---|---|---|
| 7,092,992 B1* | 8/2006 | Yu ................................. | 709/206 |
| 7,558,829 B1* | 7/2009 | Perlman et al. ............... | 709/206 |
| 2005/0081059 A1* | 4/2005 | Bandini et al. ................ | 713/201 |
| 2005/0114207 A1* | 5/2005 | Jania ............................. | 705/14 |
| 2005/0262209 A1* | 11/2005 | Yu ................................. | 709/206 |
| 2006/0031306 A1* | 2/2006 | Haverkos ....................... | 709/206 |
| 2006/0129644 A1* | 6/2006 | Owen et al. ................... | 709/206 |
| 2006/0212931 A1* | 9/2006 | Shull et al. ....................... | 726/10 |
| 2006/0253582 A1* | 11/2006 | Dixon et al. ................... | 709/225 |
| 2007/0055642 A1* | 3/2007 | Kim et al. ......................... | 707/1 |
| 2007/0192855 A1* | 8/2007 | Hulten et al. ..................... | 726/22 |
| 2008/0194241 A1* | 8/2008 | Kretz ............................. | 455/417 |

OTHER PUBLICATIONS

Computer Mail Services, Inc., "Praetor Feature/Benefit List", Available at http://www.cmsconnect.com/Praetor/FeatureChecklist,htm, copyright 2006, 6 pages.
McAfee, "McAfee System Protection McAfee SpamKiller for Mail Servers" Available at http://www.mcasfee.com/sg/products/mcafee/antispam/spk_mailserver.htm, copyright 2005,4 pages.
Seattle Pacific University, "Computer and Information Systems", Available at http://www.spu.edu/cishelpdesk/email/filtering2.asp, copyright 2003, 3 pages.
Informit.com "Stopping Spam at the Server: Part III", Available at http://www.informit.com/articles.asp?p=169638&r1=1,copyright 2006, 6 pages.
Graham, Paul, "A Plan for Spam", Available at http://www.paulgraham.com/spam.html, undated, 20 pages.
"Dealing with Spam", Available at http://security.final.gov/handouts/DealingWithSpam.pdf, undated, 4 pages.
Eide, Kristian, "Winning the War on Spam: Comparison of Bayesian Spam Filters", Available at http://home.dataparty.no/kristian/reviews/bayesian/, Mar. 4, 2003, 13 pages.
Science and Engineering at the University of Edinburgh, School of Informatics, "Dealing with Spam", Available at http://www.inf.ed.ac.uk/systems/email/spamfilter/spamfiler.html, undated, 3 pages.

(Continued)

*Primary Examiner* — Phuoc Nguyen
*Assistant Examiner* — Steven Nguyen
(74) *Attorney, Agent, or Firm* — Sheridan Ross P.C.

(57) ABSTRACT

The present invention is directed to spam filters which consider browser-generated information, such as a browser log, in determining whether an electronic message, such as an e-mail, is or is not spam.

17 Claims, 3 Drawing Sheets

OTHER PUBLICATIONS

Carnegie Mellon University, Using the Andrew Spam Filter; Through My Andrew, Available at http://www.cmu.edu/computing/documentation/spam/spamfilter.html, Oct. 21, 2004, 11 pages.

University of Cambridge, Department of Pure Mathematics and Mathematical Statistics, "Spam Tagging of E-mail for DPMMS", Available at http://dpmms.cam.ac.uk/Computing/spam.html, Sep. 29, 2005. 3 pages.

"Spam Management of the CalMail System", Available at http://mailinfo.berkely.edu/, Feb. 15, 2004, 10 pages.

Tufts University, TCCS IT Training and Document Department, "TCCS Training and Documentation Filtering Spam with Outlook XP-Tip Sheet", undated, 3 pages.

Koutsioupis, Christos, "Anti-Spam at the University of Cyprus" Available at http:////www.ucy.ac.cy/securit//docs/WhydolgetSPAM.pdf, undated, 25 pages.

"Spam Filter", Available at http://www.greencomputer.com, undated, 6 pages.

Rensselaer Help Desk, "How do the spam filtering options work?", Available at http://helpdesk.rpi.edu/update.do?artcenterkey=514, Jan. 31, 2006, 4 pages.

"Spam Karma Documentation", Available at http://www.jonabad.com/spamkarma/sk_doc.html, udated, 12 pages.

Trunbull, Don "Web Tracker: A Tool for Understanding Web Use", Available at http://www.ischool.utexas.edu/~dontum/research/webtracker/index.html, undated, 8 pages.

"Apache HTTP Server Version 1.3; Module mod_log_common", Available at http://httpd.apache.org?docs/1.3/mod/mod_log_common.html, undated, 2 pages.

"The Browser-History Web Page", Available at http://colas.nahaboo.net/browser-history/, undated, 7 pages.

FlashPeak, "Slim Browser", Available at http://www.flashpeak.com/sbrowsed, copyright 2001-2005, 3 pages.

O'Reily, "Web Admin", Available at http://www.perl.com/cs/user/query/q/6?id_topic=78, copyright 2000-2006, 4 pages.

Exacttrend, "Web Log Suite—Log Analyzer", Available at http://exacttrend.com/weblogsuite/, copyright 2001-2006, 4 pages.

Summary We Tell You More, "Products", Available at http://www.summary.net/summary.html, copyright 1998-2005, 3 pages.

Web Page—Wikipedia, the free encyclopedia, Available at http://en.wikipedia.org/wiki/Web_page, Feb. 25, 2008, 6 pages.

Web Document—Wikipedia, the free encyclopedia, Available at http://en.wikipedia.org/wiki/Web_document, Feb. 25, 2008, 3 pgs.

HTML—Wikipedia, the free encyclopedia, Available at http://en.wikipedia.org/wiki/HTML, Feb. 25, 2008, 18 pgs.

HTTP cookie—Wikipedia, the free encyclopedia, Available at http://en.wikipedia.org/wiki/HTTP_cookie, Feb. 25, 2008, 20 pgs.

Domain name—Wikipedia, the free encyclopedia, Available at http://en.wikipedia.org/wiki/Domain_name, Feb. 25, 2008, 11 pgs.

Homepage—Wikipedia, the free encyclopedia, Available at http://en.wikipedia.org/wiki/Homepage, Feb. 25, 2008, 1 page.

Website—Wikipedia, the free encyclopedia, Available at http://en.wikipedia.org/wiki/Website, Feb. 25, 2008, 8 pgs.

Whitelist—Wikipedia, the free encyclopedia, Available at http://en.wikipedia.org/wiki/Whitelist, Feb. 25, 2008, 3 pgs.

Blacklist—Wikipedia, the free encyclopedia, Available at http://en.wikipedia.org/wiki/Blacklist, Feb. 25, 2008, 5 pgs.

* cited by examiner

SPAM WHITELISTING FOR RECENT SITES

FIELD OF THE INVENTION

The invention relates generally to electronic messaging and particularly to filtering of electronic messages.

BACKGROUND OF THE INVENTION

Electronic mail (e-mail) is one of the most commonly used applications for distributed computer networks. E-mail refers to the transmission of messages, which may include further messages and/or files as attachments, by computer from one person to another. E-mail provides better connectivity and fast communication between network users. If a person is either unavailable or unwilling to pick up a message immediately, the message is stored until that person can review the stored message at a later time. E-mail messages also provide a quick and easy way to package information such as sales reports, graphics, and other data for transfer to another user by simply attaching the information to the message. Business users increasingly rely on e-mail messages to share ideas, transmit documents, schedule meetings, and perform a multitude of other everyday tasks.

Due to technological improvements in the past decade, there has been a dramatic increase in the number of unwanted, and potentially destructive, e-mails (referred to as "spam") received by users throughout the world. Spam is commonly unsolicited and blindly directed to individuals with a commercial or malicious intent. It is estimated that over 50% of all e-mail traffic is spam, causing excessive congestion in the e-mail network and Internet Service Providers (ISPs) and other organizations to spend resources processing and managing unwanted traffic. Worse, some spammers use e-mail as a preferred modality for distributing computer worms and viruses or message recipients as relay hosts to send spam to destinations maintained by the message recipient. Spam frequently obfuscates or spoofs header information to hide the e-mail source. To combat this electronic epidemic, laws, guidelines, and technological safeguards have been implemented in the past few years to reduce the number of unsolicited e-mails received by computer users.

Spam filters are one safeguard that identifies spam. Spam filters typically apply fixed, trainable, or user configurable rule sets, such as heuristic content analysis, to identify e-mail having at least a selected probability of being spam. Spam filters often perform the analysis on e-mail before the messages are passed from the gateway to the e-mail servers of the enterprise network.

Spam filters can apply one or more layers of analysis.

A first analytical layer looks for messages that originate from invalid computer domains. This type of origination information indicates that the senders are not legitimate or the address has been forged. E-mails that fit this category are rejected at the server level.

A second analytical layer compares the sender's address against a list of known spammers on a "Registered Black List" or RBL. E-mail messages from known spammers are thereby rejected.

A third analytical layer scans the headers and bodies of e-mails for one or more keywords, attachments, links, formats, and/or source addresses indicative of spam. For example, e-mail address mismatches (when the from address does not match the domain address of the server that sent the message), use of random, typically all upper case, characters or other key words in the subject line or message body, or inclusion of one or more forwards, one or more or "opt-out links, one or more "click here" links, a graphical image or active HTML script, or re-direct can all be indicative of spam. Based on the identified spam indicia (or rule matches/violations) ratings or scores are assigned to the e-mail. The scores represent a probability that the e-mail is or is not spam. E-mails having scores indicative of spam are quarantined in a spam folder, flagged, highlighted or otherwise indicated as being likely spam (e.g., by modifying the subject line of the e-mail), and/or automatically rejected or deleted. Whitelists, or lists of sources from whom the user desires to receive e-mail, can also be applied to circumvent e-mail analysis for e-mails from wanted sources.

Some spam filters use a Bayesian content filter applying advanced statistical techniques to provide greater spam detection accuracy. Bayesian filters can be trained by each user simply by categorizing each received e-mail as either spam or non-spam. After the user has categorized a few e-mails, the filter can begin to make this categorization by itself and usually with a very high level of accuracy. If the filter makes a mistake, the user re-categorizes the e-mail, and the filter learns from the re-categorization.

Despite these sophisticated spam detection methodologies, there is still a relatively high rate of false-positive (in which an e-mail is improperly identified as spam) and false-negative (in which an e-mail is improperly identified as non-spam) rates. An example of where existing spam filters fails is the registration process at newly accessed websites. Typically, a new website will require one to provide an e-mail address when he or she registers for later authentication or validation of the identity of the user. Once provided, a short e-mail is typically sent to the user, with a password or personalized URL. However, these short e-mails are frequently detected as false-positives by existing spam filters. The e-mails tend to be too short for reliable analysis of the words and come from a domain with which the user has had no prior association.

SUMMARY OF THE INVENTION

These and other needs are addressed by the various embodiments and configurations of the present invention. The present invention is directed generally to electronic message filters which consider browser-generated and/or browsing session information, such as a browser log, in determining whether an electronic message, such as an e-mail, is or is not spam.

In a first embodiment of the present invention, a method for detecting unwanted messages is provided. The method includes the steps of:

(a) receiving an electronic message addressed to a first client, the message including a header and body and the header source and destination addresses;

(b) comparing one or more of (i) a string of characters from the source address and (ii) a Universal Resource Locator ("URL") in the body with a listing of URLs derived from browsing sessions conducted by the first client; and (c) when the compared string of characters and/or URL matches an an entry in the URL listing, determining that the message has a greater probability of being wanted by a first user of the first client.

In one configuration, the spam filter consults the addressed client's browser history or log to determine which sites have been visited recently. E-mails from the same domain are given a higher "HAM" (non-spam) score than otherwise unknown domains. Even higher HAM scores can be provided to domains at which an HTTP POST operation was performed, and higher still if the e-mail address of the client was submitted in the form.

In another configuration, the existence of pop-up advertising at the domain from which the e-mail was received causes the e-mail to have a lower HAM score.

Cross-linking browser history with incoming electronic message header and/or body information can provide reduced false-positive and false-negative rates. It is well understood that more criteria used in e-mail analysis generally provides more effective spam filtration performance.

The present invention can provide a number of advantages depending on the particular configuration.

These and other advantages will be apparent from the disclosure of the invention(s) contained herein.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

Figure 1:
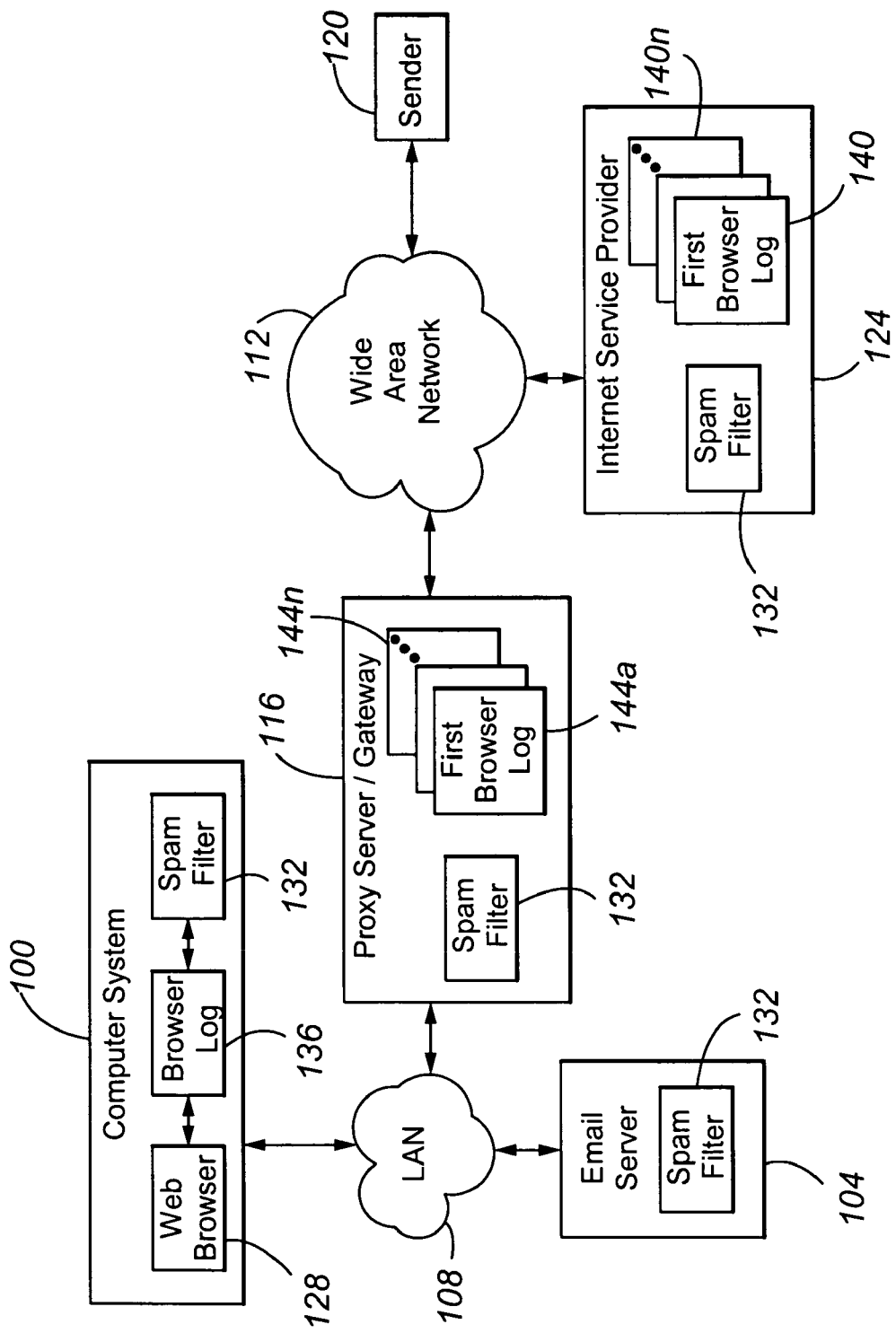
FIG. 1 is a block diagram of an architecture according to an embodiment of the present invention.

FIG. 1 illustrates a typical client-server architecture in which the present invention operates.

A computer system ("client") 100 is connected, via Local Area Network or LAN 108, to an e-mail server 104, which is typically an enterprise network server. The client 100 can be any computational endpoint providing e-mail access, such as a Personal Computer, a laptop, a Personal Digital Assistant, a cellular phone, kiosk, and the like. In typical applications, the server 104 stores files, such as e-mail, that are available to other computer systems, or clients, connected to the LAN 108. For example, the e-mail server 104 manages message traffic and mail boxes for users. As will be appreciated, the LAN 108 is a wireless and/or wired network interconnecting the client 100 and e-mail server 104.

To obtain information from the e-mail server 104, a client 100 makes a request, via the LAN 108 and a specified protocol, for a file or information located on the server 104. As will be appreciated, the Internet often uses a message standard, known as a Simple Mail Transfer Protocol (SMTP), which works in conjunction with a user's e-mail program and defines the control messages used by two computers to exchange e-mail messages. Upon reception of a properly formatted request, the server 104 downloads the file or information from a server store (not shown) to a storage (not shown) located at the client.

The server 104 is connected to a Wide Area Network or WAN 112, such as the Internet, typically via a proxy server and/or gateway 116. The proxy server and/or gateway enable the client 100 to communicate via e-mail and the TCP/IP suite of protocols with other computational components, such as sender 120. As will be appreciated, the proxy server and/or gateway 112 act(s) as an intermediary between the client 100 and Web servers, such as sender 120 and/or provide(s) translation facilities that allow message exchange between different types of e-mail programs or applications using different messaging protocols.

An Internet Service Provider or ISP 124 is a server operated by a company providing its customers with access to the Internet, typically through dial-up networking. Major service providers include, for example, Mindspring™, America Online™, Compuserve™, and Prodigy™. The ISP 124 provides file space for pages on the Web and e-mail storage.

The client 100, e-mail server 104, proxy server and/or gateway 116, and ISP 124 include a variety of software components. Specifically, an e-mail server application (such as unix mail, Groupwise™ by Novell, and/or Microsoft Exchange™ by Microsoft Corporation) (not shown) is resident in the client and e-mail server, a local (central) message store in the server (not shown) to store e-mail messages, a group assistant (not shown) in the server to extract selected information from the messages received by the server 104 and store the (full text) messages to the local store of the server 104, a message notification agent (not shown) in the client to receive the selected information from the group assistant and notify the client that an e-mail message intended for the client has been received by the server 104, a message manager (not shown) in the server for managing the messages in the local store, a local message store (not shown) in the client containing one or more queues of notification (or partial text e-mail) messages from the message notification agent, storage in the client for archiving full text e-mail messages, and a message manager (not shown) in the client for managing the messages in the client's local store and/or database. The client 100 further includes a web browser 128, such as Netscape™, Mozilla Firefox™, or Microsoft Internet Explorer™, to enable the client to read selected content, such as Hypertext Markup Language (HTML), in files or on the Web.

One or more of the ISP 124, proxy server and/or gateway 116, e-mail server 104, and client 100 contains a spam filter 132 that analyzes incoming e-mail to identify spam. The filter can perform one or more of the three levels of analysis referenced above, namely whether the selected e-mail message originates from an invalid computer domain, whether the e-mail source address is associated with an entry on a list of known spammers on a "Registered Black List" or RBL, and whether content analysis of the header and body of the e-mail provides a "HAM" score or rating indicative of spam. However, the filter 132, unlike conventional filters, maps selected information in the e-mail against the browser log 136, 140a-n, and/or 144a-n to determine a likelihood that the e-mail is from a website previously visited by the addressed client. When the e-mail is associated with a website previously visited by the client, the filter appropriately adjusts the score or rating to decrease the likelihood that the e-mail is spam.

As will be appreciated, a browser log or history is generated whenever a user conducts a web browsing session. The browser log can be maintained at multiple locations, as shown in FIG. 1. The browser log maintained at the proxy server 116 and Internet Service Provider 124 is typically on a per-subscriber basis; thus, each of these components includes a plurality of user-specific browser logs 144a-n for proxy server 116 and 140a-n for ISP 124.

Figure 2:
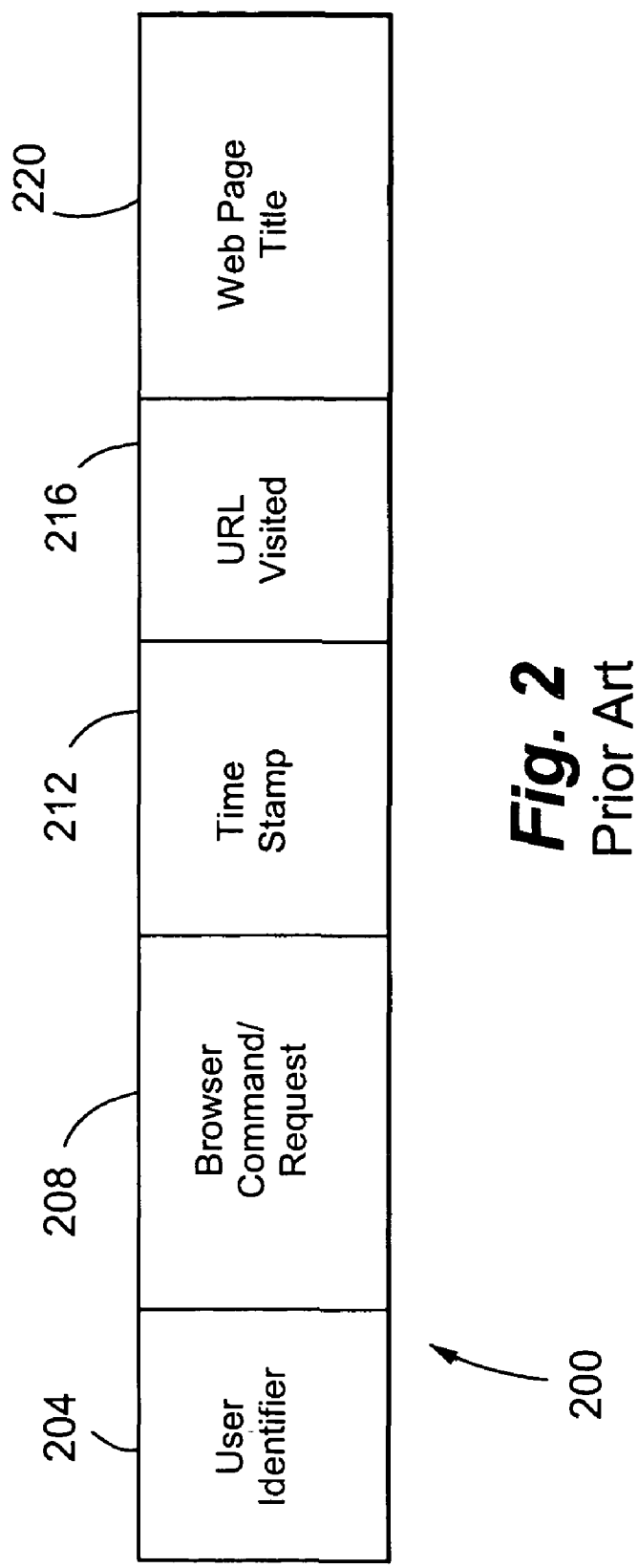
FIG. 2 depicts the data structures in a prior art web browsing history log.

A typical browser log is depicted in FIG. 2. The log 200 includes a number of fields, including user identifier 204 (which identifies the browsing user uniquely (such as by client address, password, and the like) and is optional), browser command/request 208 (which indicates the operation performed by the user at the corresponding visited web server), time stamp 212 (which indicates the time at which the corresponding command/request was submitted by the client), URL visited 216 (which identifies the URL of the web content accessed), and web page title 220 (which indicates the title of the page corresponding to the respective identified URL). Examples of browser command/request entries include a HyperText Transfer Protocol or HTTP POST request (which provides content to the accessed web server) and GET command (which retrieves content from the accessed web server). As will be appreciated, browser logs are currently maintained by most web browsers to track the state of the browsing session. In the Netscape browser for example, the browser maintains a database containing a list of all URLs visited by the corresponding client and is used by the browser to change the color of URLs which have been previously visited.

As will be appreciated, the log 200 can be of a variety of other forms and include additional or fewer items depending on the application. More elaborate logs, such as those maintained by log analyzer products (e.g., Browser-History by Colas Nahaboo of the Koala project, and Webtracker by the University of Toronto) can be used. Such logs can collect additional information including, without limitation, the interface object selected by the user (e.g., button, menu, key, etc.), browser commanded action (e.g., back, forward, reload, home, search, guide, print, security, stop, file new, file open, save as, send page, print preview, etc.), and the corresponding user activity causing the commanded action.

The log examined may be not only the detailed log of the browser, which tends to be transient (because it is maintained for a matter of days), but also more persistent lists of URLs, such as the "favorites" (which lists URL's selected and saved by the user for long periods). The filter can also examine, for matches, client caches containing the accessed web content. Such caches store web content so that, when a user hits "back" the browser can display the prior content (or web page) without having to reload it from the corresponding web server.

When the e-mail is received, the filter selects part of the e-mail source address, which is typically the part of the address after the "@" symbol, and/or a link embedded in the body of the e-mail and maps it against the URL's in the browser log, "favorite" URL listing, and/or cache. For example, assume a user has visited a website, http://www.sales.com, and then receives an e-mail from agent@sales.com. The filter would select the phrase "sales," or "sales.com" and find a match in the log, namely http://www.sales.com. In another example, an automotive dealership URL http://www.sales.com/auto_ford_taurus.htm refers to web content describing the Ford Taurus™ automobile. The filter could further select the phrases "auto", "ford", and/or "Taurus" for performing the e-mail content analysis. In either example, a match would indicate that the e-mail may be wanted and, therefore non-spam, because the user recently visited the website and may have requested further information. This is particularly the case where the user generated a "POST" command at the matching website. The user likely completed a form and hit "submit" and, therefore, the e-mail has a much lower probability of being spam. In one configuration, the filter examines the cached web content for one that resembles a form having various fields for completion by the user. Although conventional spam filters look for URLs during content analysis, they do not map the URL's against information generated by the web browser.

In one configuration, the information (e.g., in the fields of the completed form) submitted to the web server is analyzed to determine the type of information provided to the server. This information could be maintained at the ISP. When the completed form includes, for example, the name of the user of the addressed client, client's e-mail address, user's personal information (e.g., the user's street address, the user's date of birth, the user's age, the user's marital status, the user's health, the user's employer, and the like), user's financial information (e.g., income, net worth, credit card information, and the like), or what appears to be a password, there is a very high likelihood that the user is waiting for the e-mail and therefore that the e-mail is not spam.

The information can be analyzed in many ways. In one way, a spam filter located at the client obtains the information from the ISP. In another way, the ISP determines whether the addressed client submitted information to the e-mail source and whether the submitted information includes targeted fields and, if so, sets appropriate indicators in the e-mail header or body for the downstream spam filter. In yet another way, the filter is located at the ISP.

In one configuration, e-mail embedded links and other URLs are mapped against the various files noted above to determine the HAM score. If an e-mail includes a link to a previously visited website, there is a lower likelihood that the e-mail is spam. Rather, the e-mail could provide content previously of interest to the user, such as a notification that items previously viewed by the client's user are now on sale.

The filter can also consider instances of pop-ups in determining whether or not e-mail from a previously visited website qualifies as spam. Pop-ups typically indicate aggressive marketing and increase the likelihood that e-mail from the website permitting pop-ups is spam. The occurrence of pop-ups can be identified by the web browser through monitoring operations of a pop-up stopper and setting appropriate indicators or flags in the log for the corresponding URL when the pop-up stopper encounters pop-ups. As will be appreciated, pop-up stoppers are in many web browsers and/or available in separate modules that plug into the browsers. Where the pop-up stopper permits the user to determine whether or not to stop the pop-up, the user's decision can be a factor in determining the HAM score. If the user chose not to block the pop-up, there is a lesser likelihood (though it is still elevated) that the e-mail from the respective website is spam compared to a case when the user chose to block the pop-up.

Figure 3:
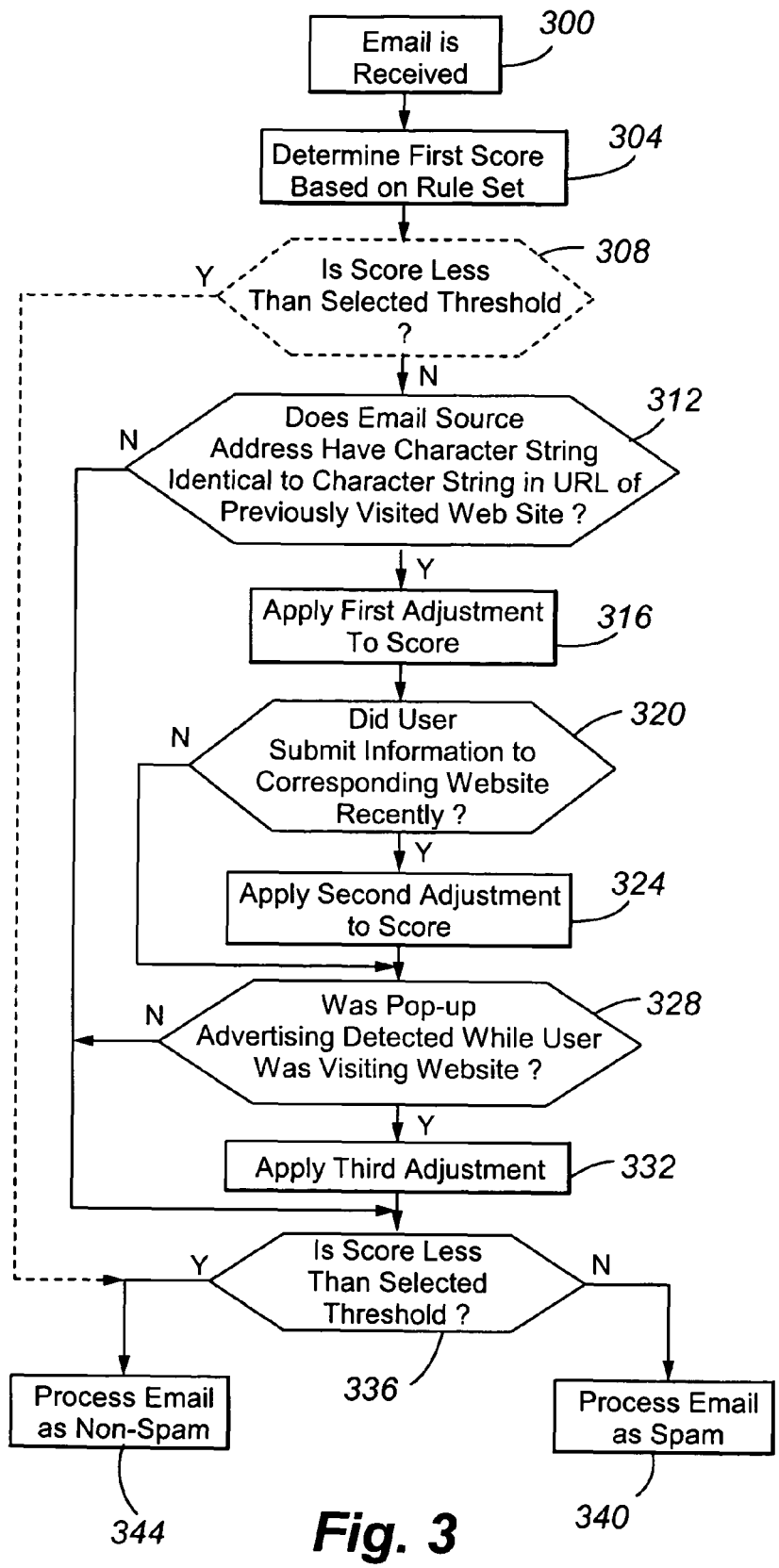
FIG. 3 is a flowchart of a spam filter according to an embodiment of the present invention.

The operation of the spam filter according to an embodiment of the present invention will now be discussed with reference to FIG. 3.

In step 300, an e-mail is received by the component containing the spam filter.

In step 304, the spam filter determines a first score or rating based on content analysis. This step may be performed using any e-mail content analyzing techniques, including those referenced above.

In optional decision diamond 308, the filter determines whether the score is less than a selected threshold. If so, the e-mail is deemed to be non-spam, and the filter proceeds to step 344. In one configuration, the decision diamond is replaced, or augmented, with a decision diamond whether the e-mail source address is on a whitelist. When the source address is on the whitelist, the filter proceeds to step 344 as there is no need to analyze the e-mail further. To conserve scarce processing resources, the whitelist check can be performed before any content analysis of the e-mail is performed.

When the score is less than the selected threshold, the filter in decision diamond 312 determines whether the e-mail source address has a character string identical to a character string in the URL of a previously visited Web site. When the character string is non-matching, the filter proceeds to decision diamond 336. When the character string is matching, the filter, in step 316, applies a first adjustment to the score. In one configuration in which a higher the score or rating means a greater likelihood that the e-mail is spam, the score is reduced by a first determined amount.

In decision diamond 320, the filter determines whether the user recently submitted information to the corresponding (matching) website. If so, a second adjustment is made in step 324 to the score. In one configuration in which a higher the score or rating means a greater likelihood that the e-mail is spam, the score is reduced by a second determined amount.

If the user has not recently submitted information to the website or after step 324, the filter, in decision diamond 328, determines whether pop-up advertising was detected while the user was visiting the matching website. If so, a third adjustment is made in step 332. In one configuration in which a higher the score or rating means a greater likelihood that the e-mail is spam, the score is increased by a third determined amount.

If no pop-up advertising was detected in decision diamond 328 or after step 332, the filter, in decision diamond 336, determines whether the score is less than the selected threshold. If so, the e-mail is processed as non-spam in step 344. If not, the e-mail is processed as spam in step 340.

A number of variations and modifications of the invention can be used. It would be possible to provide for some features of the invention without providing others.

For example in one alternative embodiment, the scoring or rating scale is reversed. In other words, when the e-mail has a score less than the selected threshold it is considered to be spam, and when it has a score greater than the selected threshold it is considered to be non-spam. In that event, the first and second adjustments are upwards and the third adjustment is downwards.

In another alternative embodiment, the present invention is applied to electronic messages other than e-mail. For example, instant or Short Message Service or SMS messages could be considered spam and need spam filtration. In this embodiment, selected characters in the instant message handle would be compared to selected characters in stored web site addresses to assist in spam detection.

In yet another embodiment, the temporal proximity of the addressed client's interaction with the source message domain is considered in assigning a spam or HAM score to the selected electronic message. Longer periods of time between web domain or server access by the client's user and the receipt of the electronic message from the domain generally indicate a higher likelihood that the message is spam. Shorter periods of time between web domain or server access by the client's user and the receipt of the electronic message from the domain generally indicate a lower likelihood that the message is spam. The demarcation between these time domains can be effected using one or more user configurable or trainable thresholds. By way of illustration, if the elapsed time is less than a first threshold, the message is deemed to be less likely to be spam. If the elapsed time is more than the first threshold but less than a second threshold, the message is deemed to have a higher likelihood of being spam. If the elapsed time is more than the second threshold, the message is deemed to have an even higher likelihood of being spam.

In yet another embodiment, dedicated hardware implementations including, but not limited to, Application Specific Integrated Circuits or ASICs, programmable logic arrays, and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be stated that the software implementations of the present invention are optionally stored on a tangible storage medium, such as a magnetic medium like a disk or tape, a magneto-optical or optical medium like a disk, or a solid state medium like a memory card or other package that houses one or more read-only (non-volatile) memories. A digital file attachment to e-mail or other self-contained information archive or set of archives is considered a distribution medium equivalent to a tangible storage medium. Accordingly, the invention is considered to include a tangible storage medium or distribution medium and prior art-recognized equivalents and successor media, in which the software implementations of the present invention are stored.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for detecting unwanted messages, comprising:
   (a) receiving, by a spam filter residing on one or more of an Internet Service Provider ("ISP"), a proxy server, a gateway, an e-mail server, and a client, an electronic message addressed to a first client, the electronic message comprising a header and body, the header comprising source and destination addresses;
   (b) generating a browser log, wherein the browser log stores at least one Universal Resource Locator ("URL") for a visited web site from at least one web browsing session;
   (c) in response to receiving the electronic message, retrieving the browser log;
   (d) comparing, by the spam filter, at least one of (i) a string of characters from the source address to a string of characters in a listing and (ii) a in the body of the electronic message with the at least one URL in the browser log; and
   (e) when at least one of the string of characters from the source address and the URL matches at least part of a URL in the browser log, determining, by the spam filter, that the electronic message has a greater probability of being wanted than not being wanted by a first user of the first client, wherein determining comprises:
      determining, by the spam filter, a first score based on a comparison of a first set of rules with the electronic message;
      when the compared at least one of (i) a string of characters and (ii) URL matches at least part of the source address, adjusting, by the spam filter, the first score by a second determined amount to produce a second score, the second score indicating a lower probability of the electronic message being spam than the first score,
      when a match exists in step (e2), determining, by the spam filter, whether information other than an email address was provided by the first user during a session with a website corresponding to the matched URL; and
      when information was provided by the first user during the session, adjusting, by the spam filter, one of the first and second scores by a third determined amount to produce a third score, the third score indicating a lower probability of the electronic message being spam than the first and second scores.

2. The method of claim 1, wherein the electronic message is an e-mail and wherein the at least one of (i) a string of characters from the source address and (ii) a URL in the body is (i).

3. The method of claim 1, wherein the electronic message is an e-mail and wherein the at least one of (i) a string of characters from the source address and (ii) a URL in the body is (ii).

4. The method of claim 1, wherein the browser log comprises only URLs selected and saved by the first user.

5. The method of claim 1, wherein the browser log is maintained in a cache of web content previously accessed by the first user.

6. The method of claim 1, wherein step (e) further comprises:
   (e5) when information other than an email address was provided by the user during the session, determining, by the spam filter, whether the information comprises at least a selected field; and
   (e6) when the information comprises at least the selected field, adjusting, by the spam filter, one of the first, second, and third scores by a fourth determined amount to produce a fourth score, the fourth score indicating a lower probability of the electronic message being spam than the first, second, and third scores.

7. The method of claim 1, further comprising:
   (f) determining, by the spam filter, whether the first user encountered at least one pop-up when visiting a URL associated with the electronic message; and
   (g) when the first user encountered at least one pop-up when visiting a URL associated with the electronic message, adjusting, by the spam filter, the first score by a fourth determined amount to produce a fourth score, the fourth score indicating a higher probability of the electronic message being spam than the first score.

8. A non-transitory computer readable medium, stored on a tangible medium, comprising processor executable instructions stored thereon operable to perform, when executed, the steps of claim 1.

9. A system for detecting unwanted messages, comprising:
   an input operable to receive an electronic messages, including a first electronic message addressed to a first client, the first electronic message comprising a header and body, the header comprising source and destination addresses; and
   a spam filter operable to:
      retrieve a browsing history including at least one Universal Resource Locator ("URL") associated with a previous web browsing session;
      compare at least one of (i) a string of characters from the source address and (ii) a in the body with the at least one URL stored in the browsing history associated with the first client;
      when the compared at least one of (i) a string of characters and (ii) URL matches at least part of a URL in the browser history, determine that the first electronic message has a greater probability of being wanted than not being wanted by a first user of the first client, wherein the in determining the first electronic message has a greater probability of being wanted, the spam filter is further operable to:
         determining a first score based on a comparison of a first set of rules with the first electronic message;
         when the compared at least one of (i) a string of characters and (ii) URL matches at least part of the source address, adjusting the first score by a second determined amount to produce a second score, the second score indicating a lower probability of the first electronic message being spam than the first score;
         when a match exists, determining whether information other than an email address was provided by the first user during a session with a website corresponding to the matched URL; and
         when information was provided by the first user during the session, adjusting one of the first and second scores by a third determined amount to produce a third score, the third score indicating a lower probability of the first electronic message being spam than the first and second scores.

10. The system of claim 9, wherein the first electronic message is an e-mail and wherein the at least one of (i) a string of characters from the source address and (ii) a URL in the body is (i).

11. The system of claim 9, wherein the first electronic message is an e-mail and wherein the at least one of (i) a string of characters from the source address and (ii) a URL in the body is (ii).

12. The system of claim 9 wherein the browsing history comprises only URLs selected and saved by the first user.

13. The system of claim 9, wherein the browsing history is maintained in a cache of web content previously accessed by the first user.

14. The system of claim 9, wherein the determining operation further comprises the sub-operations:
when information other than an email address was provided by the first user during the session, determining whether the information comprises at least a selected field; and
when the information comprises at least the selected field, adjusting one of the first, second, and third scores by a fourth determined amount to produce a fourth score, the fourth score indicating a lower probability of the first electronic message being spam than the first, second, and third scores.

15. The system of claim 9, wherein the spam filter is further operable to determine whether the first user encountered at least one pop-up when visiting a URL associated with the first electronic message and, when the first user encountered at least one pop-up when visiting a URL associated with the first electronic message, adjusting the first score by a fourth determined amount to produce a fourth score, the fourth score indicating a higher probability of the first electronic message being spam than the first score.

16. The system of claim 14, wherein third amount depends on a time elapsed between a timestamp associated with the URL in the listing and a timestamp associated with receipt of the first electronic message and wherein the selected field comprises information respecting at least one of the first user's name, the first user's street address, the first user's date of birth, the first user's age, the first user's marital status, the first user's health, an electronic message address associated with the first user, and financial information of the first user.

17. A method for detecting unwanted messages, comprising:
receiving, by a spam filter residing on one or more of an Internet Service Provider ("ISP"), a proxy server, a gateway, an e-mail server, and a client, an electronic message addressed to a first client, the electronic message comprising a header and body, the header comprising source and destination addresses;
comparing, by the spam filter, at least one of (i) a string of characters from the source address and (ii) a Universal Resource Locator ("URL") in the body with a listing of URLs derived from at least one browsing session conducted by the first client, wherein the URL listing is a browser log; and
when the compared at least one of (i) a string of characters and (ii) URL matches at least part of a URL in the listing, determining, by the spam filter, that the electronic message has a greater probability of being wanted than not being wanted by a first user of the first client, wherein determining comprises:
determining, by the spam filter, a first score based on a comparison of a first set of rules with the electronic message;
when the compared at least one of (i) a string of characters and (ii) URL matches at least part of the source address, adjusting, by the spam filter, the first score by a second determined amount to produce a second score, the second score indicating a lower probability of the electronic message being spam than the first score;
when a match exists, determining whether information other than an email address was provided by the first user during a session with a website corresponding to the matched URL; and
when information was provided by the first user during the session, adjusting one of the first and second scores by a third determined amount to produce a third score, the third score indicating a lower probability of the electronic message being spam than the first and second scores.

* * * * *